United States Patent
Van Gils et al.

(10) Patent No.: US 8,746,652 B2
(45) Date of Patent: Jun. 10, 2014

(54) METHOD FOR OPERATING A VALVE HAVING A STEPPER MOTOR AS ACTUATOR

(75) Inventors: Ed Van Gils, Gouda (NL); Giovanni Paolo De Cesare, Milan (IT); Marco Cattaneo, Saronno (IT)

(73) Assignee: Honeywell Technologies SARL, Rolle (CH)

(*) Notice: Subject to any disclaimer, the term of this patent is extended or adjusted under 35 U.S.C. 154(b) by 750 days.

(21) Appl. No.: 13/034,533

(22) Filed: Feb. 24, 2011

(65) Prior Publication Data

US 2011/0204270 A1    Aug. 25, 2011

(30) Foreign Application Priority Data

Feb. 25, 2010  (EP) .................................. 10001931

(51) Int. Cl.
*F16K 31/04* (2006.01)
(52) U.S. Cl.
USPC ................................ 251/129.04; 251/129.13
(58) Field of Classification Search
USPC .............................. 251/129.04, 129.11–129.13
See application file for complete search history.

(56) References Cited

U.S. PATENT DOCUMENTS

| | | | |
|---|---|---|---|
| 4,995,585 A * | 2/1991 | Gruber et al. ............ | 251/129.04 |
| 5,040,569 A * | 8/1991 | Nogami et al. ........... | 251/129.13 |
| 5,488,275 A * | 1/1996 | Tice ......................... | 251/129.12 |
| 6,269,838 B1 * | 8/2001 | Woodworth et al. ..... | 251/129.04 |
| 6,588,385 B2 * | 7/2003 | Fuwa ........................ | 251/129.01 |
| 6,626,146 B1 * | 9/2003 | Yanai et al. .............. | 251/129.15 |
| 6,917,203 B1 | 7/2005 | Perotti et al. | |
| 7,387,186 B2 * | 6/2008 | Soeda et al. .............. | 251/129.2 |
| 7,588,002 B2 * | 9/2009 | Wygnanski et al. ..... | 251/129.15 |
| 7,651,069 B2 * | 1/2010 | Kopecek et al. ......... | 251/129.16 |
| 2002/0088956 A1 | 7/2002 | Ozawa et al. | |
| 2006/0285265 A1 | 12/2006 | Ganev et al. | |
| 2007/0295926 A1 | 12/2007 | Kopecek et al. | |

FOREIGN PATENT DOCUMENTS

| | | |
|---|---|---|
| EP | 1217177 A2 | 6/2002 |
| GB | 2203265 A1 | 10/1988 |
| GB | 2203267 A1 | 10/1988 |

* cited by examiner

*Primary Examiner* — John Bastianelli
(74) *Attorney, Agent, or Firm* — Seager, Tufte & Wickhem LLC

(57) ABSTRACT

An illustrative method for operating a valve, where the valve includes a valve seat, a valve plunger and a stepper motor for moving the valve plunger from a first position into a second position in which the valve plunger is pressed against a valve seat and for compressing a flexible element assigned to the valve plunger in said second position. The stepper motor may be driven a defined number of steps ($N_{TOTAL}$) in order to move the valve plunger into the second position and to compress the flexible element. The method may include: driving the stepper motor a first number of steps ($N_1$) at a first current level ($I_1$); driving the stepper motor a second number of steps ($N_2$) at a second current level ($I_2$); and driving the stepper motor a third number of steps ($N_3$) at a third current ($I_3$) level.

19 Claims, 2 Drawing Sheets

METHOD FOR OPERATING A VALVE HAVING A STEPPER MOTOR AS ACTUATOR

The present application claims priority to European Patent Application No. 10 001 931.4, filed on Feb. 25, 2010, entitled "METHOD FOR OPERATING A VALVE HAVING A STEPPER MOTOR AS ACTUATOR", which is incorporated herein by reference.

TECHNICAL FIELD

This disclosure relates to a method for operating a valve and a driver for performing the same.

BACKGROUND

Valves comprise at least one valve seat, a valve plunger and an actuator for moving the valve plunger relative to the, or each valve seat from, a first position of the valve plunger into a second position of the valve plunger.

In case of a 2-way-valve, the valve comprises usually one valve seat and the actuator moves the valve plunger for a closing operation of the valve from a first position, in which the valve plunger is lifted off from the valve seat, into a second position, in which the valve plunger is pressed against the valve seat. In said second position of the valve plunger of the 2-way-valve, a flexible element assigned to the valve plunger often needs to be compressed in order to provide tightness between the valve plunger and the valve seat.

In case of a 3-way-valve, the valve comprises usually two valve seats and the actuator moves the valve plunger of the valve for a combined closing/opening operation of the valve from a first position, in which the valve plunger is pressed against a first valve seat and lifted off from a second valve seat, into a second position, in which the valve plunger is lifted off from said first valve seat and pressed against said second valve seat. In both of said positions of the valve plunger of the 3-way-valve, a respective flexible element assigned to the valve plunger often needs to be compressed in order to provide tightness between the valve plunger and the respective valve seat.

In known valves having a stepper motor as an actuator, a driver is assigned to the stepper motor which drives the stepper motor in such a way that the stepper motor provides a defined number of steps in order to move the valve plunger from the first position into the second position and in order to compress the respective flexible element assigned to the valve plunger in said second position thereby providing tightness between the valve plunger and the valve seat. It is hereby necessary that the stepper motor is driven in such a way that even in view of tolerances of the valve, the tightness between the valve plunger and the valve seat can be provided. Such tolerances include the mechanical tolerance of the nominal valve distance between the first position and the second position of the valve plunger as well as tolerances in the behaviour of the respective flexible element being assigned to the valve plunger which is influenced by external factors like temperature and pressure.

To absorb such tolerances the stepper motor of known valves is typically driven in such a way that the defined number of steps provided by the stepper motor includes always a defined number of oversteps, whereby the driver operates the stepper motor for all steps of the defined number of steps including the oversteps at the same electrical current level. Such oversteps can create a bumping noise and vibrations in the valve. Further on, not needed oversteps consume electrical energy and reduce the life-time of the valve.

SUMMARY

Against this background, a novel method for operating a valve is provided, as well as a driver for providing the same. In some illustrative embodiments, the stepper motor may be driven is such a way that for a first number of steps of said defined number of steps, the stepper motor is operated at a first electrical current level; for a subsequent second number of steps of said defined number of steps, the stepper motor is operated at a second electrical current level that is lower than the first electrical current level; and in some cases, for a subsequent third number of steps of said defined number of steps, the stepper motor is operated at a third electrical current level that is higher than the second electrical current level.

In some instances, the driver may operate the stepper motor with at least three electrical current levels, namely with a first electrical current level for a first number of steps of said defined number of steps, with a second electrical current level for a second number of steps of said defined number of steps, and with a third electrical current level for a third number of steps of said defined number of steps, wherein the second electrical current level is lower than the first electrical current level, and wherein the third electrical current level is higher than the second electrical current level. The third electrical current level can be higher or lower than said first electrical current level, or can corresponds to the first electrical current level, as desired.

With the present disclosure, it possible to ensure tightness between the valve plunger and the valve seat, absorbing all tolerances of the valve and reducing or avoiding bumping noise and vibrations in the valve. Further on, it is possible to reduce the consumption of electrical energy and to increase the life-time of the valve.

BRIEF DESCRIPTION

The disclosure may be more completely understood in consideration of the following description of various illustrative embodiments in connection with the accompanying drawings, in which.

DESCRIPTION

Figure 1:
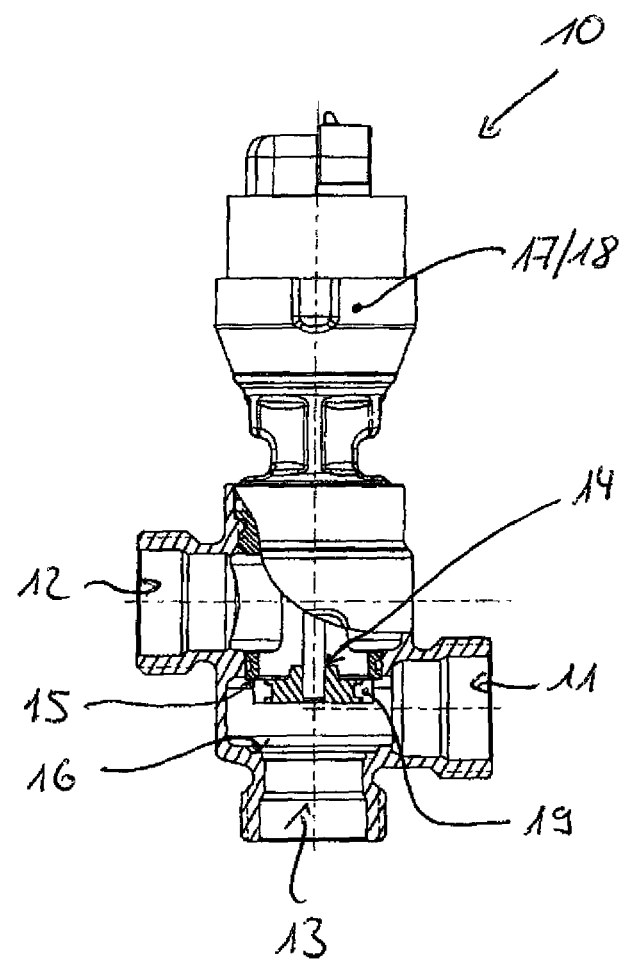
FIG. 1 shows an example of a valve, namely a 3-way-valve, which can be operated according to the method of the present disclosure.

FIG. 1 shows a valve 10 being a 3-way-valve having three openings 11, 12, and 13, having a valve plunger 14 and having two valve seats 15 and 16. In a first position of the valve 10, namely of the valve plunger 14, the valve plunger 14 is pressed against the valve seat 15 and is lifted off from the valve seat 16, thereby allowing a flow of a medium, e.g. of water, between the openings 11 and 13. In a second position of the valve 10, namely of the valve plunger 14, the valve plunger 14 is pressed against the valve seat 16 and is lifted off from the valve seat 15, thereby allowing a flow of the medium between the openings 11 and 12.

The valve 10 further includes a stepper motor 17, whereby a driver 18 is assigned to the stepper motor 17 in order to move the valve plunger 14 between said two positions. The driver 18 can be part of the valve 10 or can be separated from the valve 10. In each of said two positions of the 3-way-valve 10 according to FIG. 1, it is desirable to compress a respective flexible element 19 assigned to the valve plunger 14 in order to help ensure tightness between the valve plunger 14 and the respective valve seat 15 or 16.

The stepper motor 17 may be driven by the driver 18 in such a way that the stepper motor 17 provides a defined number of steps $N_{TOTAL}$ (see FIGS. 2, 3 and 4) in order to move the valve plunger 14 from the first position into the second position or vice versa from the second position into the first position and to compress the respective flexible element 19 assigned to the valve plunger 14 in the respective end position in order to provide tightness between the valve plunger 14 and the respective valve seat 15 or 16.

In order to provide the defined number of steps $N_{TOTAL}$, the driver 18 may operate the stepper motor 17 of the valve 10 with an electrical current level, whereby the term electrical current level is defined as the nominal electrical current level over one full step of the stepper motor 17 or any higher resolution of the stepper motor 17 also called as half step or micro step.

According to the present disclosure (see FIGS. 2, 3 and 4), the stepper motor 17 may be driven is such a way that for a first number of steps $N_1$ of said defined number of steps $N_{TOTAL}$, the driver 18 may operate the stepper motor 17 at a first electrical current level $I_1$; that for a subsequent second number $N_2$ of steps of said defined number of steps $N_{TOTAL}$, the driver 18 may operate the stepper motor 17 at a second electrical current level $I_2$ that is lower than the first electrical current level $I_1$; and in some cases, that for a subsequent third number of steps $N_3$ of said defined number of steps $N_{TOTAL}$, the driver 18 may operate the stepper motor 17 at a third electrical current $I_3$ level that is higher than the second electrical current level $I_2$.

According to a first illustrative embodiment of the present disclosure (see FIG. 2), said third electrical current $I_3$ level may correspond to said first electrical current level $I_1$. According to a second illustrative embodiment (see FIG. 3), the third electrical current $I_3$ level may be lower than said first electrical current level $I_1$. According to a third illustrative embodiment (see FIG. 4), the third electrical current $I_3$ level may be higher than said first electrical current level $I_1$. Each of said electrical current levels used to operate the stepper motor 17 by the driver 18 should be understood in a way that the respective electrical current level is the nominal electrical current level over one full step of the stepper motor or any higher resolution of the stepper motor also called as half step or micro step.

Said defined number of steps $N_{TOTAL}$ may include in case of the 3-way-valve of FIG. 1: a) steps needed to travel the valve plunger 14 along a nominal distance of the valve 10 between the first position of the valve plunger 14 and the second position of the same, b) steps needed to compensate mechanical tolerances of said nominal distance, c) steps needed to compress the respective flexible element 19 assigned to the valve plunger 14 in the second position of the same thereby providing tightness between the valve plunger 14 and the respective valve seat 15 or 16, and d) steps needed to decompress the respective flexible element 19 assigned to the valve plunger 14 in the first position of the same.

In case of the 3-way-valve shown in FIG. 1 at both of said position of the valve plunger 14 there is a valve seat 15, 16 meaning that the nominal distance of the valve 10 between the first position of the valve plunger 14 and the second position of the same is the nominal distance between the two valve seats 15 and 16.

In case of a 2-way-valve, said steps d) needed to decompress the respective flexible element 19 assigned to the valve plunger 14 in the first position of the same have not to be considered for the number of steps $N_{TOTAL}$.

Said defined number of steps $N_{TOTAL}$ is preferably determined by calculations using means of statistical tolerance analysis and may depend on the concrete valve design and application of the same.

Said first number of steps $N_1$ being part of the defined number of steps $N_{TOTAL}$ may be in a range between a minimum first number of steps and a maximum first number of steps. In other words, said first number of steps $N_1$ being part of the defined number of steps $N_{TOTAL}$ can be adjusted between two limits, namely said minimum first number of steps and said maximum first number of steps.

Said maximum first number of steps may include in case of the 3-way-valve of FIG. 1: a1) steps needed to travel the valve plunger 14 along the nominal distance between the first position the valve plunger 14 and the second position of the same, a2) steps needed to compensate mechanical tolerances of said nominal distance, and a3) steps needed to decompress the respective flexible element 19 assigned to the valve plunger 14 in the first position of the same.

In case of a 2-way-valve, said steps a3) needed to decompress the respective flexible element 19 assigned to the valve plunger 14 in the first position of the same may not be considered for said maximum first number of steps.

Said maximum first number of steps is preferably determined by calculations using means of statistical tolerance analysis and depends on the concrete valve design and application of the same.

Said minimum first number of steps may include in case of the 3-way-valve of FIG. 1: b1) steps needed to travel the valve plunger 14 from the first position into a transition position being located between said first position and said second position in which forces acting on the valve plunger 14 against the valve plunger movement are lower than the stepper motor force at the second electrical current level $I_2$, b2) steps needed to decompress the respective flexible element 19 assigned to the valve plunger 14 in the first position of the same.

In case of a 2-way-valve, said steps b2) needed to decompress the respective flexible element 19 assigned to the valve plunger 14 in the first position of the same may not be considered for said minimum first number of steps.

Said minimum first number of steps is preferably determined by testing and may depend on the concrete valve design and application of the same.

When the stepper motor 17 would provide said maximum first number of steps, the valve plunger 14 would contact the respective valve seat 15 or 16 in the second position of the valve plunger 14 without compressing the respective flexible element 19. When the stepper motor 17 would provide said minimum first number of steps, the valve plunger 14 would be in said transition position in which forces acting on the valve plunger 14 against the valve plunger movement are lower than the stepper motor force at the second current level $I_2$.

Said third number of steps $N_3$ being part of the defined number of steps $N_{TOTAL}$ includes steps needed to compress the respective flexible element assigned to the valve plunger 14 when said valve plunger is pressed against the respective valve seat 15 or 16 in the second position and from the characteristics of the stepper motor 17.

Said third number of steps $N_3$ may be higher than a minimum number of steps needed to compress the respective flexible element 19 ensuring tightness between the valve plunger 14 and the respective valve seat 15 or 16 and has to be lower than the number of steps providing maximum compression of the respective flexible element 19 at the third electrical current level $I_3$.

In an illustrative embodiment, said third number of steps $N_3$ may include the minimum number of steps needed to compress the respective flexible element 19 ensuring tightness between the valve plunger 14 and the respective valve seat 15 or 16 and the maximum number of steps which the stepper motor 17 might loose due its characteristics when the stepper motor 17, namely the rotor and stator of the same, takes his equilibrium position after turning off the electrical current supply to the stepper motor 17.

Said third number of steps $N_3$ is preferably determined by testing and depends on the concrete valve design and application of the same.

Said second number of steps $N_2$ being part of the defined number of steps may be determined from the defined number of steps $N_{TOTAL}$, the first number of steps $N_1$ and the third number of steps $N_3$ using the formula:

$$N_2 = N_{TOTAL} - N_1 - N_3.$$

Said second number of steps $N_2$ may be determined in such a way that the same is optimized depending on the concrete valve design and the application of the same.

The optimization can be done by varying the first number of steps $N_1$ between the two limits, namely said minimum first number of steps and said maximum first number of steps, and/or by adjusting the second electrical current level $I_2$ and/or by adjusting the third electrical current level $I_3$.

The first electrical current level $I_1$ may be determined in such a way that the stepper motor force at the first electrical current level is higher than forces acting on the valve plunger 14 against the valve plunger movement in the first position of the valve plunger 14.

The second electrical current level $I_2$ may be determined in such a way that the stepper motor force at the second electrical current level is higher than forces acting on the valve plunger 14 against the valve plunger movement in the transition position of the valve plunger 14 between said first position and said second position of the same.

The third electrical current level $I_3$ may be determined in such a way that the stepper motor force at the third electrical current level is higher than forces acting on the valve plunger 14 against the valve plunger movement in the second position of the valve plunger 14.

Figure 2:
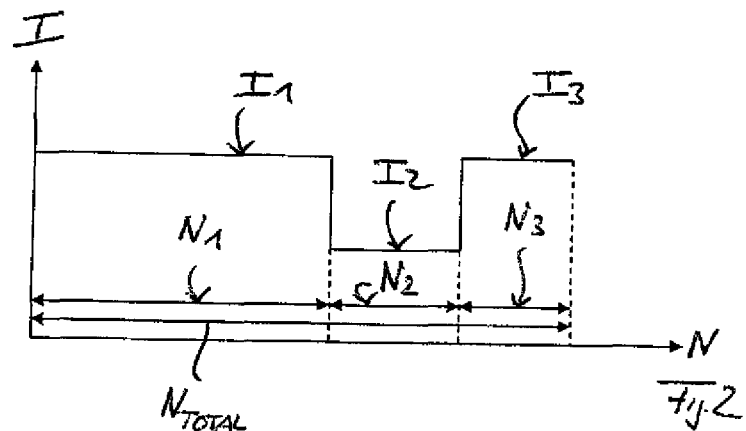
FIG. 2 shows a diagram illustrating a first embodiment of an illustrative method of the present disclosure.
Figure 3:
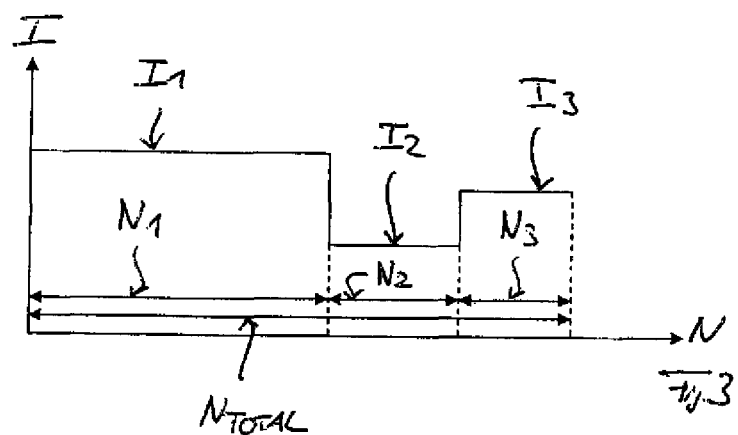
FIG. 3 shows a diagram illustrating a second embodiment of an illustrative method of the present disclosure.
Figure 4:
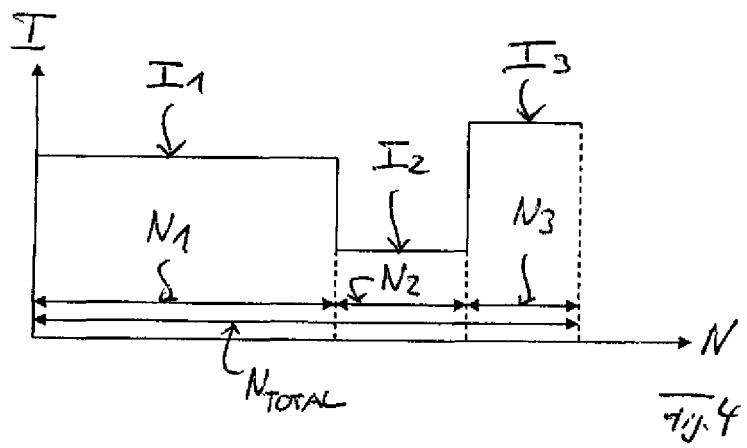
FIG. 4 shows a diagram illustrating a third embodiment of an illustrative method of the present disclosure.

Each of said electrical current levels $I_1$, $I_2$ and $I_3$ may be greater than zero (see, for example, FIG. 2 to FIG. 4). Further on, each of said number of steps $N_1$, $N_2$ and $N_3$ may be greater than zero (see, for example, FIG. 2 to FIG. 4).

The present disclosure may help ensure tightness between the valve plunger 14 and the respective valve seat 15 or 16 at the second position of the valve plunger 14, absorbing all tolerances of the valve 10 and reducing or avoiding bumping noise and vibrations in the valve 10. Further on, it is possible to reduce the consumption of electrical energy and to increase the life-time of the valve 10.

LIST OF REFERENCE SIGNS 10 valve
11 opening
12 opening
13 opening
14 valve plunger
15 valve seat
16 valve seat
17 stepper motor
18 driver
19 flexible element

What is claimed is:

1. A method comprising:
   operating a valve, wherein the valve has at least one valve seat, a valve plunger and a stepper motor for moving the valve plunger with respect to the or each valve seat, namely for moving the valve plunger from a first position into a second position in which the valve plunger is pressed against a valve seat and for compressing a flexible element assigned to the valve plunger in said second position, whereby the stepper motor is driven in such a way that the stepper motor provides a defined number of steps ($N_{TOTAL}$) in order to move the valve plunger from the first position into the second position and in order to compress the flexible element thereby providing tightness between the valve plunger and the valve seat, wherein operating the valve comprises driving the stepper motor in such a way that:
   for a first number of steps ($N_1$) of said defined number of steps ($N_{TOTAL}$), the stepper motor is operated at a first current level ($I_1$);
   for a subsequent second number ($N_2$) of steps of said defined number of steps ($N_{TOTAL}$), the stepper motor is operated at a second current level ($I_2$) being lower than the first current level ($I_1$); and
   for a subsequent third number of steps ($N_3$) of said defined number of steps ($N_{TOTAL}$), the stepper motor is operated at a third current ($I_3$) level being higher than the second current level ($I_2$).

2. The method of claim 1, wherein said third electrical current ($I_3$) level is higher than said first current level ($I_1$).

3. The method of claim 1, wherein said third current ($I_3$) level is lower than said first current level ($I_1$).

4. The method of claim 1, wherein said third current ($I_3$) level corresponds to said first current level ($I_1$).

5. The method of claim 1, wherein said defined number of steps ($N_{TOTAL}$) comprises:
   a) steps needed to travel the valve plunger along a nominal distance between the first position and the second position;
   b) steps needed to compensate mechanical tolerances of said nominal distance;
   c) steps needed to compress the flexible element assigned to the valve plunger in the second position of the same thereby providing tightness between the valve plunger and the valve seat; and
   d) steps needed to decompress a flexible element assigned to the valve plunger in case said valve plunger is pressed against a valve seat in the first position.

6. The method of claim 5, wherein said first number of steps ($N_1$) is in a range between a minimum first number of steps and a maximum first number of steps, wherein
   a) said maximum first number of steps comprises:
      a1) steps needed to travel the valve plunger along the nominal distance between the first and the second position;
      a2) steps needed to compensate the mechanical tolerances of said nominal distance;
      a3) steps needed to decompress the respective flexible element assigned to the valve plunger in case said valve plunger is pressed against a valve seat at the first position;

b) said minimum first number of steps comprises:
b1) steps needed to travel the valve plunger from the first position into a transition position in which forces acting on the valve plunger against the valve plunger movement are lower than the stepper motor force at the second current level; and
b2) steps needed to decompress the respective flexible element assigned to the valve plunger in case said valve plunger is pressed against a valve seat at the first position.

7. The method of claim 5, wherein said third number of steps ($N_3$) is determined from the steps needed to compress the respective flexible element assigned to the valve plunger in the second position of the same thereby providing tightness between the valve plunger and the valve seat and from the characteristics of the stepper motor.

8. The method of claim 7, wherein said second number of steps ($N_2$) is determined from the defined number of steps ($N_{TOTAL}$), the first number of steps ($N_1$) and the third number of steps ($N_3$) using the formula:

$$N_2 = N_{TOTAL} - N_1 - N_3.$$

9. The method of claim 8, wherein said second number of steps ($N_2$) is determined in such a way that the same is optimized.

10. The method of claim 1, wherein the first current level ($I_1$) is determined in such a way that the stepper motor force at the first current is higher than forces acting against the valve plunger movement in the first position.

11. The method of claim 1, wherein the second current level ($I_2$) is determined in such a way that the stepper motor force at the second current is higher than forces acting against the valve plunger movement in an transition position of the valve plunger between said first position and said second position.

12. The method of claim 1, wherein the third current level ($I_3$) is determined in such a way that the stepper motor force at the third current is higher than forces acting against the valve plunger movement in the second position.

13. A method comprising:
operating a valve, wherein the valve has at least one valve seat, a valve plunger and a stepper motor for moving the valve plunger with respect to the or each valve seat, namely for moving the valve plunger from a first position into a second position in which the valve plunger is pressed against a valve seat and for compressing a flexible element assigned to the valve plunger in said second position, wherein the valve plunger has a range of motion from the first position to the second position, wherein operating the valve comprises driving the stepper motor in such a way that:
for a first portion of the range of the range of motion of the valve plunger toward the second position, the stepper motor is operated at a first current level ($I_1$);
for a subsequent portion of the range of motion of the valve plunger toward the second position, the stepper motor is operated at a second current level ($I_2$) that is lower than the first current level ($I_1$); and
for a subsequent portion of the range of motion of the valve plunger toward the second position, the stepper motor is operated at a third current ($I_3$) level that is higher than the second current level ($I_2$).

14. The method of claim 13, wherein said third current ($I_3$) level is higher than said first current level ($I_1$).

15. The method of claim 13, wherein said third current ($I_3$) level is lower than said first current level ($I_1$).

16. The method of claim 13, wherein said third current ($I_3$) level corresponds to said first current level ($I_1$).

17. A driver comprising:
the driver driving a stepper motor of a valve, the valve having a valve seat and a valve plunger, wherein the stepper motor can move the valve plunger from a first position to a second position in which the valve plunger addresses the valve seat and compresses a flexible element assigned to the valve plunger in said second position, the valve plunger having a range of motion from the first position to the second position, the driver is programmed to:
drive the stepper motor at a first current level ($I_1$) to move the valve plunger along a first portion of the range of motion of the valve plunger toward the second position; and then
drive the stepper motor at a second current level ($I_2$) to move the valve plunger along a second portion of the range of motion of the valve plunger further toward the second position, wherein the second current level ($I_2$) is less than the first current level ($I_1$); and then
drive the stepper motor at a third current level ($I_3$) to move the valve plunger along a third portion of the range of motion of the valve plunger even further toward the second position wherein the second current level ($I_2$) is less than the third current level ($I_3$).

18. The driver of claim 17, wherein the third current level ($I_3$) is higher than the first current level ($I_1$).

19. The driver of claim 17, wherein the third current level ($I_3$) corresponds to the first current level ($I_1$).

* * * * *